Figure 1:
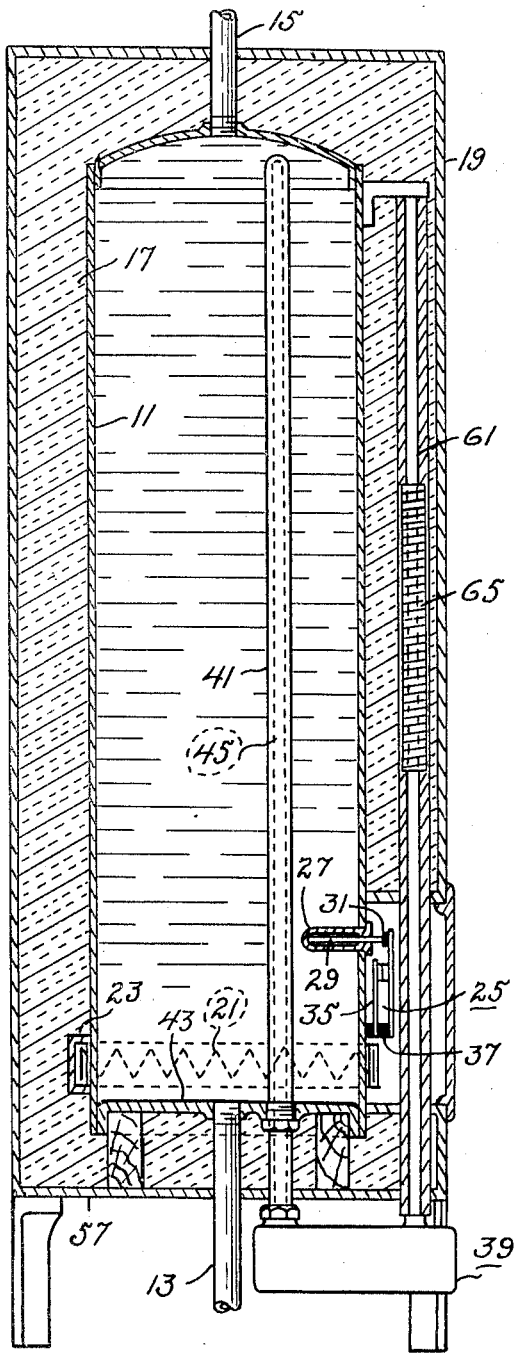

Feb. 6, 1945.  C. M. OSTERHELD  2,368,773
WATER HEATER CONTROL SYSTEM
Filed Jan. 17, 1944  2 Sheets-Sheet 1.

INVENTOR.
CLARK M. OSTERHELD
BY
ATTORNEY

Feb. 6, 1945.  C. M. OSTERHELD  2,368,773
WATER HEATER CONTROL SYSTEM
Filed Jan. 17, 1944  2 Sheets-Sheet 2

INVENTOR.
CLARK M. OSTERHELD
BY
ATTORNEY

Patented Feb. 6, 1945

2,368,773

UNITED STATES PATENT OFFICE 2,368,773

WATER HEATER CONTROL SYSTEM

Clark M. Osterheld, Stoughton, Wis., assignor to McGraw Electric Company, Elgin, Ill., a corporation of Delaware Application January 17, 1944, Serial No. 518,635

8 Claims. (Cl. 219—39)

My invention relates to control systems and particularly to electric tank water heater control systems.

An object of my invention is to provide a control system for a domestic hot water tank that shall embody a thermal retarder of particular design for selectively causing the heater to be energized either immediately or with a time delay period in accordance with the amount of hot water withdrawn from the tank.

Another object of my invention is to provide a control system for a tank water heater that shall embody a thermal retarder heater control switch unit having an expansion rod as a component actuating means therein, said rod being adapted to extend substantially throughout the length of the tank therein.

Other objects of my invention will either be apparent from a description of a control system embodying my invention or will be set forth during the course of such description and particularly set forth in the appended claims.

Figure 2:
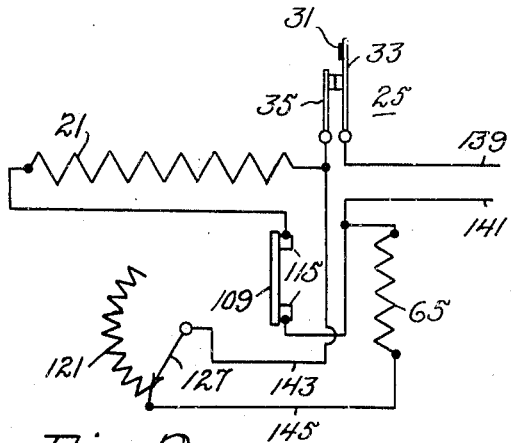
Figure 3:
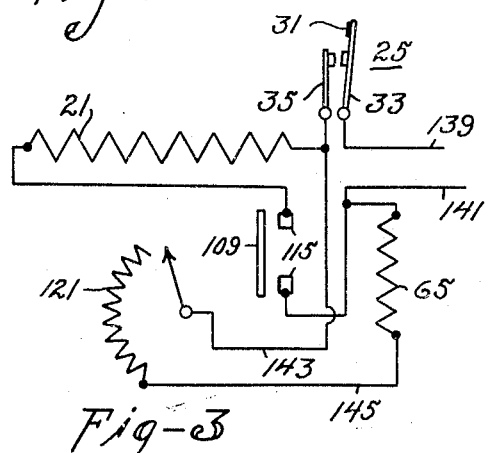
Figure 4:
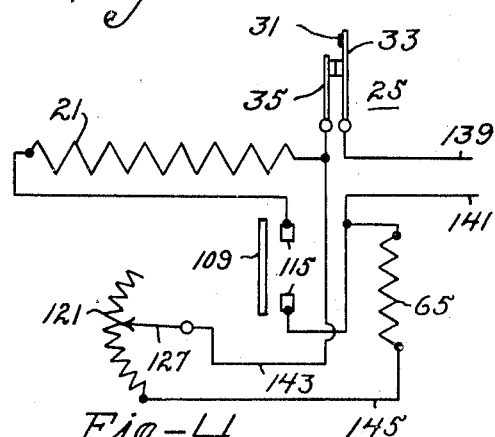
Figure 5:
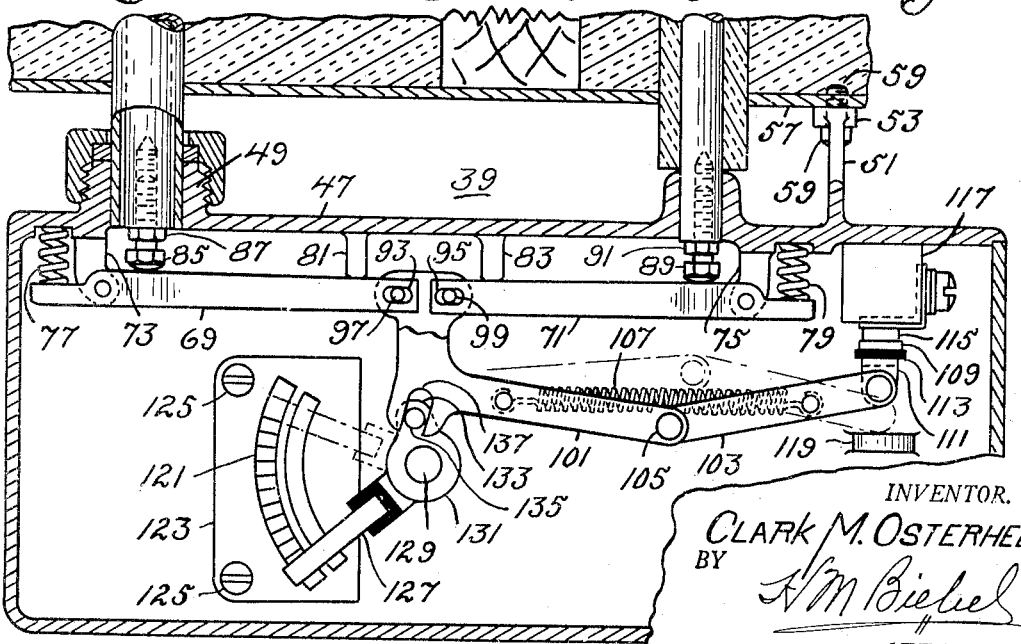

In the drawings,

Figure 1 is a vertical, sectional view of a domestic hot water tank having associated therewith a control system embodying my invention, Fig. 2 is a circuit diagram of the electrical circuit showing the contacts in the positions they occupy when the tank is full of cold water, Fig. 3 is the same as Fig. 2 except the positions of the contacts are shown as when the tank is full of hot water, Fig. 4 is a circuit diagram the same as shown in Fig. 2, except that the positions of the contacts are shown as when the top portion of the tank contains hot water and the lower portion thereof contains cold water, and, Fig. 5 is a fragmentary, enlarged, sectional view similar to Fig. 1, showing the thermal retarder elements in the positions they will occupy when the tank is full of cold water, the electrical contacts being the same as shown in Fig. 2.

Referring first of all to Fig. 1 of the drawings, I have there illustrated a hot water tank 11 having a lower cold water inlet pipe 13, an upper hot water outlet pipe 15 and being surrounded by heat-insulating material 17, which latter may be held in proper operative position by an outer casing 19.

I provide preferably, but not necessarily, one electric heater 21 which, if only a single heater is provided, is located near the lower end portion of the tank and in a tunnel member 23. While I have shown heater 21 as being a clamp-on type of heater, I do not desire to be limited thereto.

I provide a lower first thermally-actuable heater control switch which I have designated generally by the numeral 25 and have illustrated as comprising a tube 27 having a closed inner end and having its open outer end connected in fluid-tight engagement with the tank 11 at a point near to the lower end portion of the tank and above the heater 21. I provide an expansion rod 29 positioned in the tube 27 and adapted to engage a lug 31 of electric-insulating material on the outer free end of a resilient contact arm 33 which is adapted to engage with and be disengaged from a substantially rigid contact arm 35. Means for supporting the two contact arms may include blocks 37 of electric-insulating material. Normally the resilient contact arm 33 is adapted to engage the contact arm 35 and will do so when the length of expansion rod 29 is relatively short, as will be the case when tube 27 is subject to and surrounded by cold water. When, in the specification, hereinafter I refer to cold water, I desire it to be understood that the temperature of such cold water may be 60° to 70° F.

I provide a thermal retarder heater control switch unit designated generally by numeral 39, which unit includes an elongated tube 41 which is secured in a fluid-tight manner in the lower closure member 43 of tank 11. The length of the tube 41 is substantially that of the tank and extends downwardly below the closure 43 a short distance. Within the tube 41 I locate a rod 45 which is of relatively high expansion material, such as aluminum.

I provide a switch casing 47 below the tank 11, which casing has a screw-threaded tubular upper projection 49 thereon at one end thereof and has further a rib-like extension 51 at its other end. The upper end of extension 51 has a slightly enlarged end portion or head 53 thereon, which latter may be held against the lower closure member 57 of casing 19 as by a pair of machine screws 59.

I provide, in addition to the high-expansion member constituted by rod 45, a second thermally-expansible element here shown as a second rod 61 which is preferably out of close thermal communication with the tank. Its upper end may have fixed engagement with a bracket 63 which may be of a suitable heat-insulating material. I provide a heating coil 65 on either a portion of the linear extent of rod 61 or over substantially its entire length and provide further a heat-insulating casing 67 therearound. This heat-insulating casing extends preferably over the entire length of tube 61.

While I have illustrated and described one form of the second low-expansion element, I do not desire to be limited thereto since other forms may be used in place of the rod 61.

Within the switch casing 47 I provide a pair of lever arms 69 and 71 which are pivotally mounted adjacent to one end thereof on pivot pins supported by depending lugs 73 and 75. The short arm of lever 69 is engaged by a spring 77, and the short arm of lever 71 is engaged by a spring 79 in order to hold the long arm of the respective levers 69 and 71 against stop members 81 and 83 depending from the cover of casing 47. Rod 45 may have screw-threaded into its lower end an adjustable machine bolt 85 held in adjusted position by a lock nut 87 while rod 61 may have a machine bolt 89 screw-threaded into its lower end held in adjusted position by a lock nut 91. The heads of adjustable bolts 85 and 89 are adapted to engage the long arms of levers 69 and 71 adjacent to their respective pivot pins supporting the respective lever arms.

The two longer pieces of lever arms 69 and 71 extend toward each other and are each provided with an elongated slot 93 and 95 adapted to receive trunnion pins 97 and 99 which are adapted to support a first toggle member 101 of substantially L-shape. The substantially vertical part of toggle 101 is short while the substantially horizontally-extending part thereof is longer. A second toggle member 103 is adapted to have pivotal connection with the outer end of arm 101 as by a trunnion pin 105 and an over center spring 107 connects the two long parts of toggle members 101 and 103 in a manner well known in the art to provide a switch arm having snap acting movement from its closed to its open position.

Toggle member 103 has mounted thereon a contact bridging member 109 insulated from a bar 111 pivotally mounted on member 103 by electric-insulating material 113. Contact bridging member 109 is adapted to be engaged with and disengaged from a pair of contact members 115 (only one of which is shown in Fig. 5) the two contact members being mounted on a block 117 of electric-insulating material which is secured in any suitable or desired manner to the upper part of casing 47. A stop member 119 is provided below the outer end of toggle member 103.

Since it is desired to variably energize the heating coil 65 of the thermal retarder heater control switch unit, I provide an adjustable rheostat 121 which may be supported by a plate 123 of electric-insulating material against a part of casing 47, being held thereagainst by screws 125. The amount of resistance of the rheostat 121 connected in electric series circuit with heater 65 is adjusted by a contact brush 127 pivotally mounted on a stub shaft 129. The brush 127 is electrically insulated from a supporting member 131 which has a short arm 133 having a pin 135 therein adapted to fit into an elongated slot 137 constituting a part of toggle member 101.

It is evident that the toggle structure comprising arms 101 and 103 is pivotally supported by the two pins 97 and 99 and that turning movement of lever arm 69 in a clockwise direction will cause turning movement of the first toggle member 101 in a counter-clockwise direction. It is further evident that turning movement of the second lever arm 71 in a counter-clockwise direction by reason of expansion of rod 61 will cause turning movement of the first toggle member 101 in a clockwise direction.

The turning movement of lever arm 69 in a clockwise direction is caused by expansion of rod 45 while turning movement of lever arm 69 in a counter-clockwise direction is the result of contraction of expansion rod 45 followed up by action of spring 77 on rod 69. Turning movement of lever arm 71 in a clockwise direction is caused by contraction of rod 61 followed up by the action of spring 79 on lever arm 71.

Let it now be assumed that the tank is either first filled with cold water or during the usual routine operation and use of the tank is filled with cold water because of withdrawal of substantially all of the hot water therefrom. The design, construction and adjustment of the lower thermally-actuable heater control switch 25 is such that when it is subject to cold water, the temperature of which, as has already been hereinbefore stated, may be from 60° to 70° F., will cause the engagement of the two contact arms 33 and 35 as shown more particularly in Fig. 2 of the drawings. Further, the high expansion rod 45 will also be subject over its entire length to cold water with the result that it will contract and cause turning movement of toggle member 101 in a clockwise direction with the result that contact bridging member 109 will be moved quickly into engagement with contact members 115. The two contact members 115 are shown as being connected in series electric circuit with one terminal of heater 21, the other terminal of which is connected to contact arm 35. The other contact arm 33 is connected to a supply circuit conductor 139. A second supply circuit conductor 141 is connected to the other terminal 115. One terminal of adjustable rheostat 121 is connected by a conductor 143 with contact arm 35. The other terminal of rheostat 121 is connected by a conductor 145 with one terminal of heating coil 65, the other terminal of which is connected to supply circuit conductor 141.

Under the conditions hereinbefore described, namely, that the tank 11 is substantially full of cold water, contact arms 33 and 35 will be in engagement and contact bridging member 109 will also be moved into engagement with contact terminals 115 and energization of heater 21 will therefore be effected immediately. As is shown in Fig. 2, energization of the heating coil 65 is also effected and only a small part of the resistance of rheostat 121 will be in circuit with heating coil 65, so that the temperature of the low-expansion rod 61 will be raised to its maximum value (on the order of 300° F. or more) within a few hours. The heating of more and more water in the tank will cause more and more of the length of the high-expansion rod 45 to be subject to hot water (having a temperature of 150° F. or more) with attendant increase in its length and if it be assumed that it will require six hours to heat all of the water in the tank, it is evident that the switch controlled by the two expansion members will remain closed until substantially all of the water in the tank is hot, when expansion of rod 29 in thermal switch 25 will cause disengaging movement of contact arm 33 from contact arm 35 and deenergization of the heater 21 and heating coil 65. The temperature of rod 61 will decrease and its reduced length cooperating with the increased length of rod 45 will cause opening of the switch controlled thereby.

Fig. 4 of the drawings shows the positions of the thermally-actuable heater control switch 25 and of the thermal retarder heater control switch comprising contact bridging member 109 and terminals 115 which may be occupied by these members when substantially the upper one-half or more of the tank is full of hot water and heating coil 65 has been energized for only a relatively short length of time. Heating up of the second thermally-expansible element 61 would cause expansion thereof and even though the first high-expansion rod 45 was subject to hot water over substantially one-half of its length with resultant turning movement of lever arm 69 in a clockwise direction and a tendency therefore to move contact bridging member 109 out of engagement with terminals 115, the adjustment may be such, as has been set forth, that the second thermally-expansible element 61 would have been caused to expand to such an extent as to close the thermal retarder heater control switch so that energization of heater 21 would continue. I have shown, in Fig. 4 of the drawings, that the contact bridging member 109 has been moved out of engagement with terminals 115 but energization of heating coil 65 would continue, although at a lower rate, with the final result that contact bridging member 109 would again be moved into engagement with terminals 115 and reenergization of heater 21 would be effected.

Referring now to Fig. 3 of the drawings I have there shown the positions of the parts of the control system, and particularly of the switches thereof, which they will occupy when substantially all of the water in the tank is hot. By hot I mean a temperature on the order of 150° F. or slightly higher. When substantially all of the water in the tank has been heated to a temperature on the order of 150° F., the rod 29 will have been caused to expand to such a length as will cause disengagement of contact arm 33 from contact arm 35 with the result that the supply of current to heater 21 is interrupted, and the energization of heating coil 65 is also interrupted since its energization is controlled by the thermally-actuable heater control switch 25. This deenergization of heating coil 65 will cause decrease in length of the second thermally-actuable element 61 with the result that the two toggle members 101 and 103 will move into the open position, shown in Fig. 5 by broken lines.

Let it now be assumed that hot water has been withdrawn from the tank through say the daytime or a twenty-four hour day, the amount of hot water withdrawn being sufficient to cause the tube 27 to be subjected to cold water with the result that the contact arm 33 will engage contact arm 35 and will cause a predetermined part of the resistance of rheostat 121 to be connected in circuit with heating coil 65. Since, under these conditions, the length of the second thermally-expansible element is a minimum or nearly so, and since the greater part of rod 45 is subject to hot water, a predetermined part of the resistance of rheostat 121 will be connected in series circuit with heating coil 65, the amount of resistance connected in circuit with the heating coil being dependent upon the amount of cold water in the lower portion of the tank. The greater the amount of cold water in the lower portion of the tank, the less will be the resistance of the rheostat connected in circuit with the heating coil 65 so that the time period of delay before closing of the thermal retarder heater control switch will be decreased accordingly. On the other hand, the smaller the amount of cold water in the tank, the greater will be the resistance of the rheostat connected in circuit with the heating coil, and therefore the heating up of the second expansion element 61 will be greater in accordance therewith. This is made possible by the use of the snap-acting switch members actuated by the two expansion rods 45 and 61.

The lower thermally-actuable heater control switch 25 is effective to cause deenergization of the heater 21 when substantially all of the water in the tank is hot.

It is possible to so adjust the various parts of my improved control system that energization of the heater 21 may be delayed for a period of time, the length of which is sufficient to cause the energization of heater 21 to be effected during off-peak portions of a twenty-four day. Such off-peak portions may, for instance, be in the early afternoon hours and in the late night hours after midnight, and water will usually be withdrawn from the tank during the early morning hours and during the early evening hours under normal living conditions in the ordinary home.

Various modifications may be made in the system embodying my invention without departing from the spirit and scope thereof, and all such modifications coming clearly within the scope of the appended claims shall be considered as covered thereby.

I claim as my invention:

1. A control system for a hot water tank having a cold water inlet at the bottom of the tank, a hot water outlet at the top of the tank and an electric heater at the lower end of the tank, said system comprising a first thermally-actuable heater control switch mounted on the tank at the lower end portion thereof adapted to be in closed position when subject to the temperature of cold water in the tank, and a second thermally-actuable heater control switch unit in series circuit relation with said first switch and including a thermal-expansion rod extending axially into the tank and through substantially the entire length thereof, a second thermally-expansible element supported by said tank out of close thermal communication therewith, a heating coil for said second thermally-expansible element, the energization of said heating coil being controlled by said first heater control switch, said first and said second switch being in closed heater-energizing position immediately after the tank is filled with cold water.

2. A control system for a hot water tank having a cold water inlet at the bottom of the tank, a hot water outlet at the top of the tank and an electric heater at the lower end of the tank, said system comprising a first thermally-actuable heater control switch mounted on the tank at the lower end portion thereof adapted to be in closed position when subject to the temperature of cold water in the tank, and a second thermally-actuable heater control switch unit in series circuit relation with said first switch and including a thermal-expansion rod extending axially into the tank and through substantially the entire length thereof, a second thermally-expansible element supported by said tank out of close thermal communication therewith, a heating coil for said second thermally-expansible element, the energization of said heating coil being controlled by said first heater control switch, said first and said second switch being in closed heater-energizing position immediately after the tank is filled with cold water and said first heater control switch being effective to deenergize said heater when substantially all of the water in the tank has been heated to a predetermined temperature.

3. A control system for a hot water tank having a cold water inlet at the bottom of the tank, a hot water outlet at the top of the tank and an electric heater at the lower end of the tank, said tank being subject to withdrawals of varying quantities of hot water therefrom during a twenty-four hour day, said system comprising a first thermally-actuable heater control switch subject to tank water temperature at the lower end of the tank and a second thermally-actuable heater control switch unit in series circuit with said first switch and comprising a thermally-expansible rod extending axially into the tank and through substantially the entire length thereof, a second thermally-expansible element fixedly supported out of close thermal communication with said tank, a heating coil for said second element, the energization of which is controlled by said first switch and a pair of pivotally mounted lever arms actuable by said respective thermally-expansive rod and said second thermally-expansible element and mechanically connected to said switch, said first heater control switch being in closed position when subjected to cold water and causing energization of said heating coil, said second switch being in open position when said thermally-expansible rod is subject to hot water, said energized heating coil causing expansion of said second thermally-expansible element and closing of said second heater control switch and energization of said electric heater a predetermined length of time after start of energization of said heating coil.

4. A control system for a hot water tank having a cold water inlet at the bottom of the tank, a hot water outlet at the top of the tank and an electric heater at the lower end of the tank, said tank being subject to withdrawals of varying quantities of hot water therefrom during a twenty-four hour day, said system comprising a first thermally-actuable heater control switch subject to tank water temperature at the lower end of the tank and a second thermally-actuable heater control switch unit in series circuit with said first switch and comprising a thermally-expansible rod extending axially into the tank and through substantially the entire length thereof, a second thermally-expansible element fixedly supported out of close thermal communication with said tank, a heating coil for said second element, the energization of which is controlled by said first switch and a pair of pivotally mounted lever arms actuable by said respective thermally-expansive rod and said second thermally-expansible element and mechanically connected to said switch, said first heater control switch being in closed position when subjected to cold water and causing energization of said heating coil, said second switch being in open position when said thermally-expansible rod is subject to hot water, said energized heating coil causing expansion of said second thermally-expansible element and closing of said second heater control switch and energization of said electric heater a predetermined length of time after start of energization of said heating coil, said electric heater being deenergized by said first heater control switch when substantially all of the water in the tank is hot.

5. A control system for a hot water tank having a cold water inlet at the bottom of the tank, a hot water outlet at the top of the tank and an electric heater at the lower end of the tank, said tank being subject to withdrawals of varying quantities of hot water therefrom during a twenty-four hour day, said system comprising a first thermally-actuable heater control switch subject to tank water temperature at the lower end of the tank, and a second thermally-actuable heater control switch unit in series circuit with said first switch and comprising a thermally-expansible rod extending axially into the tank and through substantially the entire length thereof, a second thermally-expansible element fixedly supported out of close thermal communication with said tank, a heating coil for said second element, the energization of which is controlled by said first switch and a pair of pivotally mounted lever arms actuable by said respective thermally-expansive rod and said second thermally-expansible element and mechanically connected to said switch, said first heater control switch being in closed position when subjected to cold water and causing energization of said heating coil, said second switch being in open position when said thermally-expansible rod is subject to hot water, said energized heating coil causing expansion of said second thermally-expansible element and closing of said second heater control switch and energization of said electric heater with a time period of delay after start of energization of said heating coil, the length of said delay period increasing in proportion to the amount of hot water in the tank.

6. A control system for a hot water tank having a cold water inlet at the bottom of the tank, a hot water outlet at the top of the tank and an electric heater at the lower end of the tank, said tank being subject to withdrawals of varying quantities of hot water therefrom during a twenty-four day, said system comprising a first thermally-actuable heater control switch subject to tank water temperature at the lower end of the tank, and a second thermally-actuable heater control switch unit in series circuit with said first switch and comprising a thermally-expansible rod extending axially into the tank and through substantially the entire length thereof, a second thermally-expansible element fixedly supported out of close thermal communication with said tank, a heating coil for said second element, the energization of which is controlled by said first switch and a pair of pivotally mounted lever arms actuable by said respective thermally-expansive rod and said second thermally-expansible element and mechanically connected to said switch, said first heater control switch being in closed position when subjected to cold water and causing energization of said heating coil, said second switch being in open position when said thermally-expansible rod is subject to hot water, said energized heating coil causing expansion of said second thermally-expansible element and closing of said second heater control switch and energization of said electric heater with a time period of delay after start of energization of said heating coil, the length of said delay period decreasing in proportion to the amount of cold water in the tank.

7. A control system for a hot water tank having a cold water inlet at the bottom of the tank, a hot water outlet at the top of the tank and an electric heater at the lower end of the tank, said tank being subject to withdrawals of varying quantities of hot water therefrom during a twenty-four hour day, said system comprising a first thermally-actuable heater control switch subject to tank water temperature at the lower end of the tank, and a second thermally-actuable heater control switch unit in series circuit with said first switch and comprising a thermally-expansible rod extending axially into the tank and through substantially the entire length thereof, a second thermally-expansible element fixedly supported out of close thermal communication with said tank, a heating coil for said second element, the energization of which is controlled by said first switch and a pair of pivotally mounted lever arms actuable by said respective thermally-expansive rod and said second thermally-expansible element and mechanically connected to said switch, said first heater control switch being in closed position when subjected to cold water and causing energization of said heating coil, said second switch being in open position when said thermally-expansible rod is subject to hot water, said energized heating coil causing expansion of said second thermally-expansible element and closing of said second heater control switch and energization of said electric heater with a time period of delay after start of energization of said heating coil, the length of said delay period increasing in proportion to the amount of hot water in the tank, said electric heater being deenergized by said first heater control switch when substantially all of the water in the tank is hot.

8. A control system for a hot water tank having a cold water inlet at the bottom of the tank, a hot water outlet at the top of the tank and an electric heater at the lower end of the tank, said tank being subject to withdrawals of varying quantities of hot water therefrom during a twenty-four hour day, said system comprising a first thermally-actuable heater control switch subject to tank water temperature at the lower end of the tank and a thermal retarder heater control switch unit comprising a switch connected in series circuit with said first switch, a pair of dissimilarly thermally-actuable expansion members for actuating said switch, the first thermally-actuable member being a rod of high-expansion metal extending into the tank through substantially the entire length of the tank, a second thermally-expansible member of less thermal expansivity than said first member positioned out of close thermal communication with said tank, a heating coil for said second thermally-expansible member controlled by said first switch, a pair of lever arms adapted to actuate said thermal retarder switch and a rheostat in series circuit with said heating coil and mechanically connected to and operable by said thermal retarder switch to cut out substantially all of the rheostat when said first thermally-expansible member is subject to cold water over its entire length, both said heater control switches being in closed position when the tank contains cold water only, said first switch only being closed when the tank is on the order of half full of cold water until the thermal retarder switch is closed by expansion of said second expansion member to reenergize the heater, the reenergization continuing until hot water engages said first switch.

CLARK M. OSTERHELD.